United States Patent
Jansson

(10) Patent No.: US 7,371,032 B2
(45) Date of Patent: May 13, 2008

(54) BORING BAR FOR INTERNAL TURNING

(75) Inventor: Gunnar Jansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/649,365

(22) Filed: Jan. 4, 2007

(65) Prior Publication Data

US 2007/0183856 A1    Aug. 9, 2007

(30) Foreign Application Priority Data

Jan. 10, 2006    (SE)    ............................. 0600039

(51) Int. Cl.
*B23B 29/02*    (2006.01)
(52) U.S. Cl. .......................... 407/11; 407/120
(58) Field of Classification Search ................ 407/11, 407/113, 114, 115–119, 120; 82/50, 901
See application file for complete search history.

(56) References Cited

U.S. PATENT DOCUMENTS

| | | | | |
|---|---|---|---|---|
| 5,156,503 A | * | 10/1992 | Tsujimura et al. | 408/187 |
| 5,261,767 A | * | 11/1993 | Tsujimura et al. | 408/187 |
| 5,823,720 A | * | 10/1998 | Moore | 408/204 |
| 5,848,862 A | * | 12/1998 | Antoun | 408/199 |
| 6,126,365 A | * | 10/2000 | Okawa et al. | 407/66 |

* cited by examiner

*Primary Examiner*—Willmon Fridie, Jr.
(74) *Attorney, Agent, or Firm*—Drinker Biddle & Reath LLP

(57) ABSTRACT

A boring bar, such as for internal turning, includes a front pocket that is defined by a shelf-like surface and a ramp surface, an insert seat that is countersunk in the shelf surface and disposed asymmetrically in relation to a center axis, a chip flute that is countersunk in the outside of the bar is disposed on the same side of the center axis as the insert seat, and an internal channel that supplies a fluid to the front part of the bar. The fluid channel ends in an outlet mouth disposed on the side of the bar that is opposite the insert seat in order to guide a flow of the fluid past the insert seat toward the front opening of the chip flute.

8 Claims, 4 Drawing Sheets

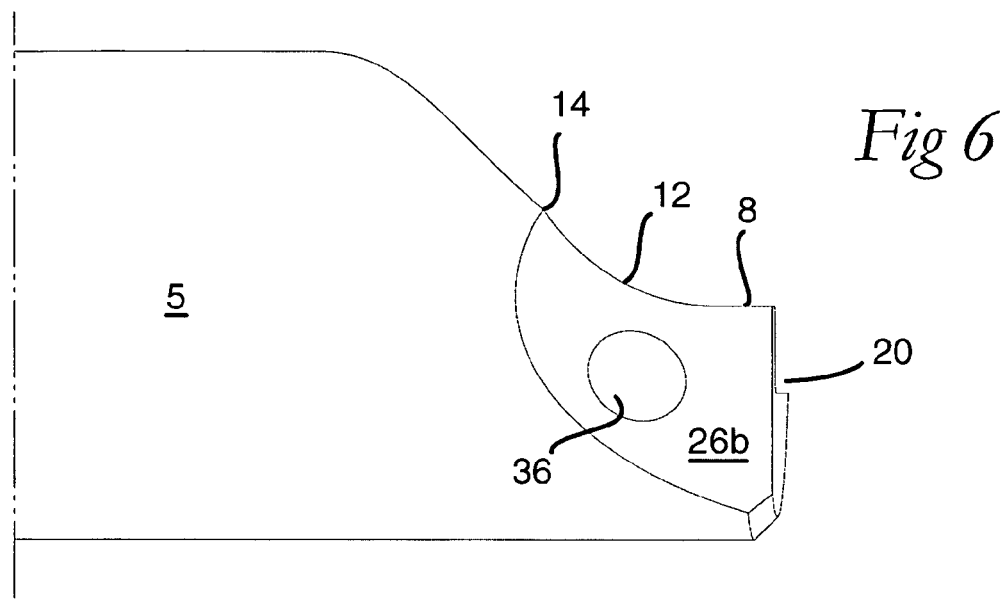
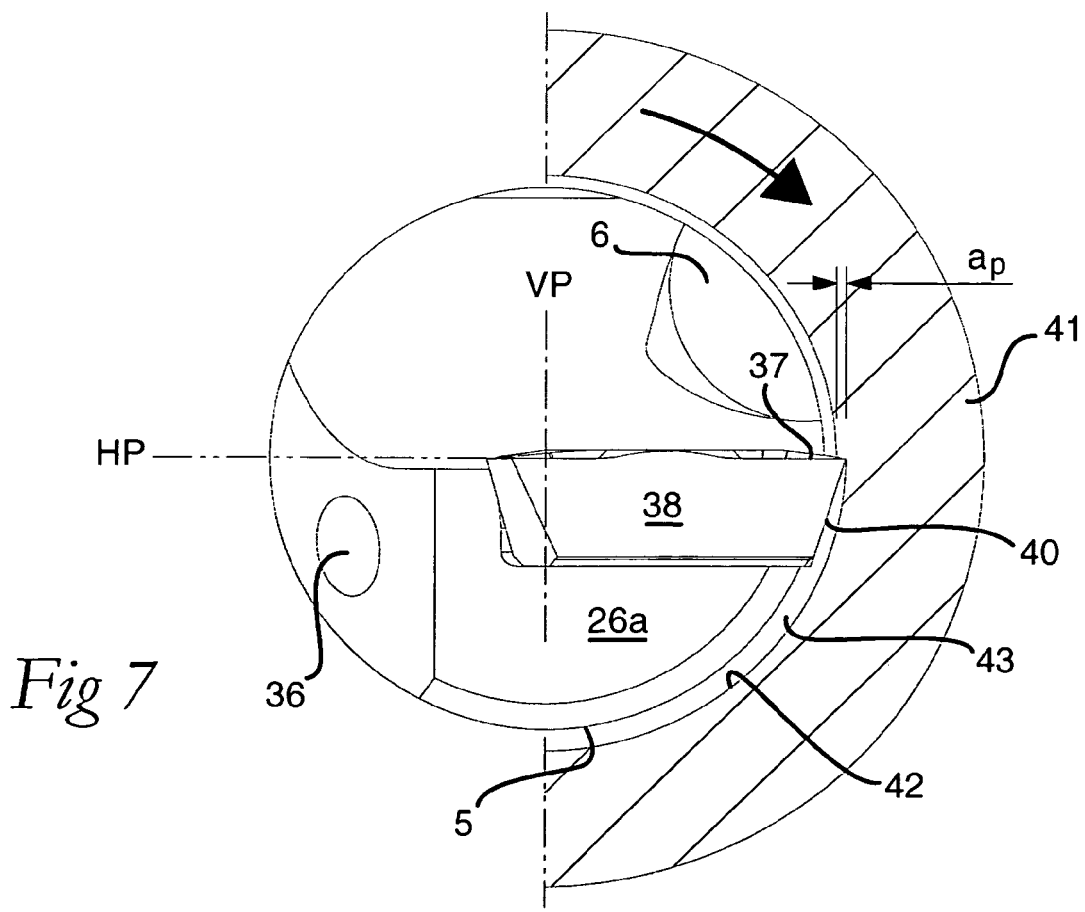

BORING BAR FOR INTERNAL TURNING

CROSS-REFERENCE TO RELATED APPLICATIONS

This application claims priority under 35 U.S.C. § 119 to Sweden Patent Application No. 0600039-2, filed on Jan. 10, 2006, the disclosure of which is incorporated by reference herein in its entirety.

BACKGROUND OF THE INVENTION

1. Field of the Invention

This invention relates to a boring bar intended for internal turning, e.g., in a hole in a workpiece. Preferably, the boring bar includes a center axis that extends toward a front part. The front part may include a front end surface and a pocket, which includes a shelf-like surface and a ramp surface. Preferably, the ramp surface extends obliquely/rearward from the shelf surface. A turning insert may be disposed in an insert seat, which is countersunk in the shelf surface and displaced toward one side of the center axis. A chip flute is preferably recessed into an exterior surface of the bar and disposed on the same side of the center axis as the insert seat. Preferably, the chip flute includes a front opening at the ramp surface.

2. Description of Related Art

Internal turning may be carried out in pre-drilled holes, pre-formed holes, etc. in cast, extruded, or otherwise manufactured workpiece blanks, e.g., metal workpiece blanks. Open holes are through going, i.e., open at opposite ends, while closed holes have only one opening and end in a bottom. Internal turning is frequently used in applications with stringent requirements for dimensional tolerances and surface finish. As compared to external turning, there are certain specific difficulties associated with internal turning including a limited boring depth because unacceptably strong vibrations may occur when the boring bar is too long and slender. Accordingly, internal turning is conventionally limited to holes having a depth that is at most 3 to 6 times the diameter of conventional boring bars. Another difficulty is chip evacuation. Insofar as it is generally desirable to provide a hole with a good surface finish, it is preferably that the chips formed by internal turning should not be allowed to aggressively contact the finished hole surface inasmuch as the chips commonly have sharp edges that may mar the finish. In other words, it is preferable to quickly and efficiently evacuate the chips from the hole. Conventionally, this may be achieved as long as the hole is open and/or has a diameter that is sufficiently great to receive a conventional boring bar that has a considerably smaller diameter. That is to say, conventional boring bars need ample space between the envelope surface of the bar and the hole surface so as to allow chips to pass fairly freely. However, the problem of chip evacuation is accentuated when it is desired to turn small, closed holes, i.e., holes having bottoms and diameters of 12 millimeters (mm) or less, e.g., 6 mm or less. However, in order to provided a boring bar that is stable, i.e., that is as vibration free as possible, and that has the ability to carry a replaceable turning insert, conventional boring bars are made with a diameter that is just slightly less than the diameter of the hole. Consequently, the annular space available between the envelope surface of a conventional boring bar and the hole surface is reduced to a minimum size (frequently 1 mm or less). In order to even be able to evacuate the chips from a closed hole under such circumstances, a related boring bar is provided with an external chip flute, e.g., a groove that is countersunk in the envelope surface of the related boring bar and that extends a distance rearward from a forward pocket in which the turning insert is mounted. However, a shortcoming of this related boring bar is that the chips may move in an uncontrolled way in the forward pocket, i.e., without any guidance toward the chip flute.

Conventional turning tools for external turning are per se usually made with internal channels for feeding cooling liquid to the turning insert. However, the mouth of the cooling-liquid channel is conventionally disposed to feed the cooling liquid forward from behind the turning insert, i.e., not a rearward direction toward a chip flute opening.

BRIEF SUMMARY OF THE INVENTION

The present invention relates to overcoming the above-mentioned shortcomings of conventional turning tools.

In accordance with an aspect of an embodiment of the invention, there is provided a boring bar, which together with a turning insert forms a tool capable of generating holes having excellent surface finish and dimension tolerances. More precisely, the tool provides efficient and stable control of chip evacuation, and at the same time provides a bar that is robust and avoids troublesome vibrations. The boring bar is preferably made in such a way that the greater part of the cross section area of a small hole is utilized to impart stiffness to the bar while minimizing the risk of chip stopping or other effects that may jeopardize the surface finish of the hole. Additionally, the boring bar provides efficient chip evacuation without being complicated or expensive to manufacture. Further, another aspect is to provide a boring bar having the capability of receiving exceptionally small turning inserts, without the stability of the turning inserts in the insert seat becoming inferior. Furthermore, the boring bar is preferably made in such a way that a co-operating turning insert should be mountable and dismountable in a fast and easy way, and without altering the exact spatial position of the cutting tip relative to the bar.

In accordance with another aspect of an embodiment of the invention, there is provided a boring bar for internal turning in a workpiece. The boring bar includes a center axis about which there is relative rotation with respect to the workpiece, a front part including a front end surface and a pocket, a chip flute, and an internal channel adapted to supply a fluid to the front part. The pocket includes a shelf-like surface and a ramp surface that extends obliquely from the shelf surface. The shelf-like surface includes a countersunk insert seat that is adapted to receive a turning insert, and the insert seat is disposed asymmetrically with respect to the center axis. The chip flute extends backward from a front opening in the ramp surface of the pocket. The chip flute is defined by a recess in an external surface and is disposed on a same side of the center axis as is the insert seat. The internal channel includes an outlet mouth that is disposed on an opposite side of the center axis from the insert seat. Wherein the fluid is adapted to flow past the insert seat toward the front opening of the chip flute.

In accordance with a further aspect of an embodiment of the invention, there is provided an outlet mouth of an internal channel, e.g., for supplying a fluid such as a cooling liquid, that is located far forward on the bar and on the side of the front part of the bar that is opposite the turning insert and the chip flute. Accordingly, when machining closed holes, the fluid passes along the topside of the turning insert toward the front opening of the chip flute, wherein the fluid will be flushed against the chips and exert a pressure thereon, so that they are compelled to move along with the liquid flow toward the chip flute.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 6 is a partial side view of the front part of the bar as shown in FIG. 1.

FIG. 7 is an end view showing the machining of a rotating workpiece by the complete tool.

DETAILED DESCRIPTION OF THE PREFERRED EMBODIMENTS

Figure 1:
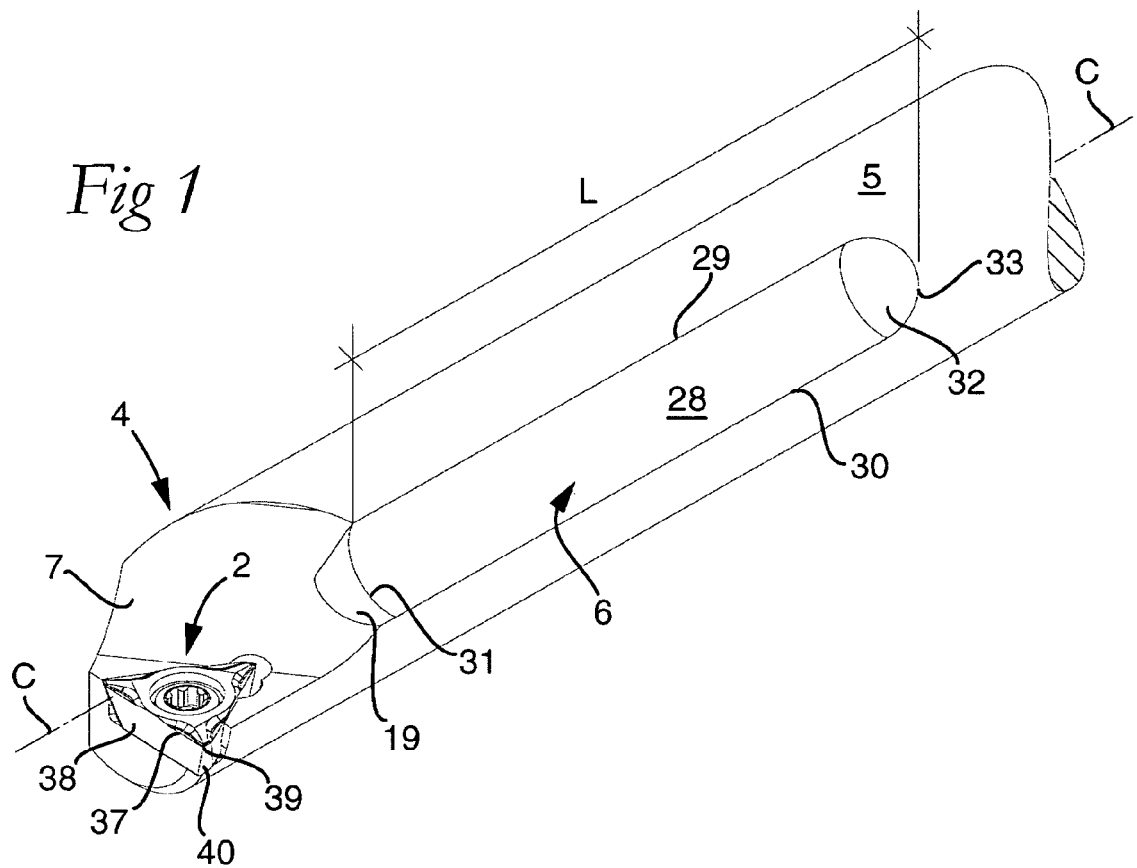
FIG. 1 is a partial perspective view of a turning tool according to an embodiment of the invention, such as may be used for internal turning. The turning tool includes a turning insert mounted on a bar.
Figure 2:
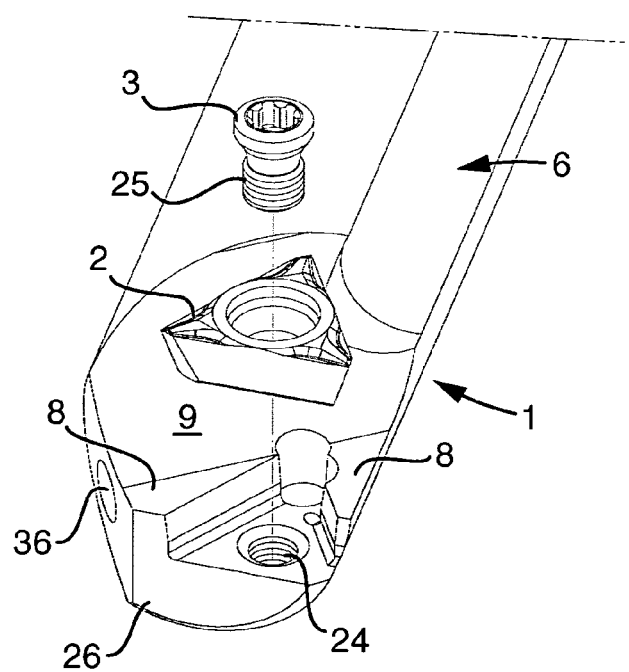
FIG. 2 is a somewhat enlarged, exploded perspective view showing the turning insert and a tightening member removed from an insert seat at the front part of the bar as shown in FIG. 1.

FIGS. 1 and 2, a boring bar 1, a turning insert 2 and a tightening screw 3, form an example of a complete tool for internal turning. The bar 1 has the shape of a long narrow body having a cylindrical basic shape, which ends in a front part 4. That is to say, a surface 5 of the bar 1 defines a generally cylindrical envelope, and a countersunk chip flute 6 is formed in the surface 5. A central axis C is concentric with the envelope of the surface 5.

Figure 3:
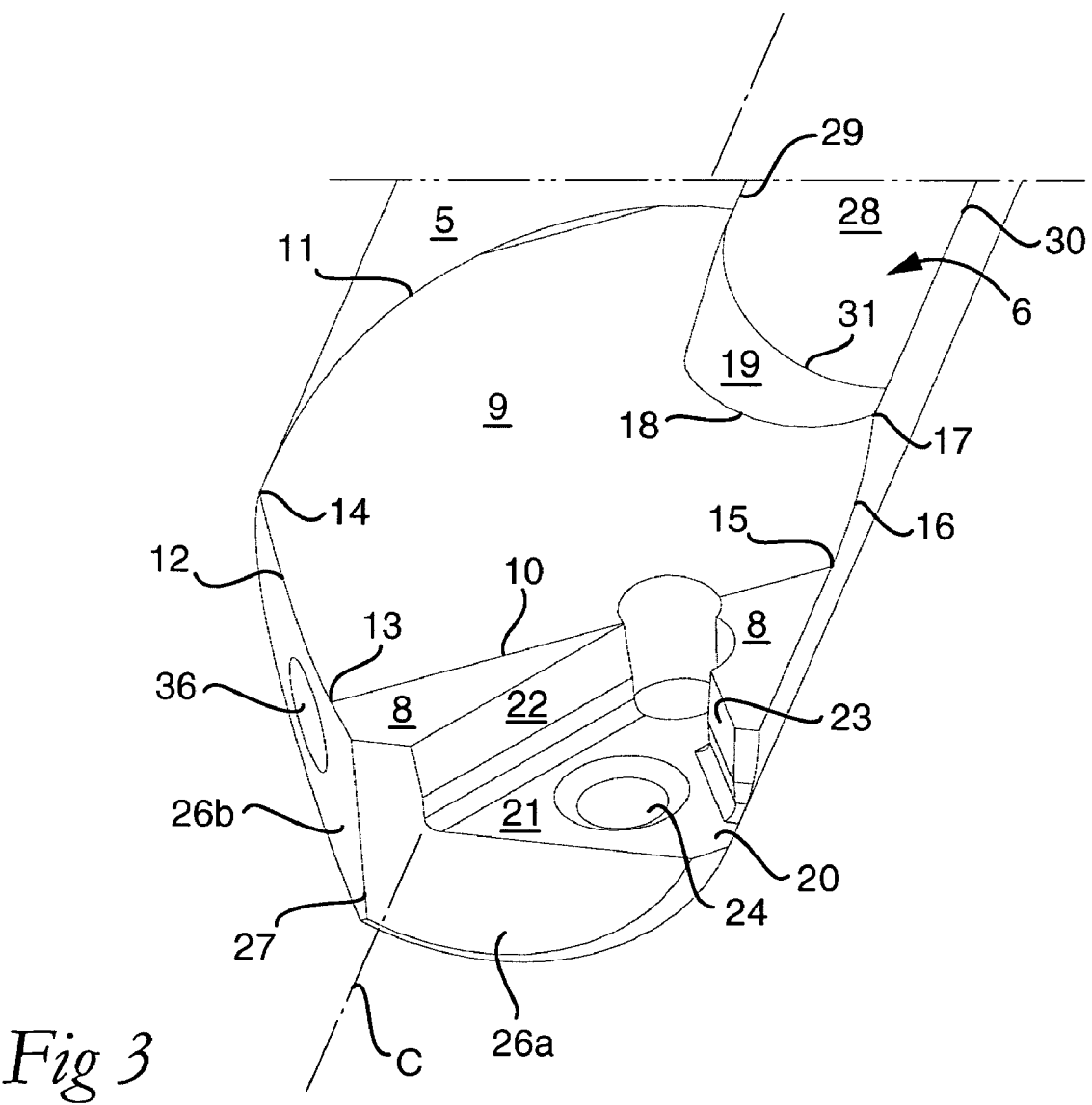
FIG. 3 is a further enlarged perspective view, more precisely as viewed obliquely from the front/above, showing only the front part of the bar as shown in FIG. 1.

In the front part 4 of the bar, a pocket 7 is formed, which is delimited by a shelf-like surface 8 as well as by a ramp-like surface 9. The ramp surface 9 preferably extends upward/rearward from the shelf surface 8. Preferably, the shelf surface 8 is planar, and the ramp surface 9 is concavely arched and extends from a front, straight borderline 10 (see also FIG. 3) toward a rear arched borderline 11. The borderline 10—and thereby the entire ramp surface 9—is obliquely inclined at an acute angle α (see FIG. 5) to the center axis C. Preferably, α is about 57°. In front, the ramp surface 9 is also delimited by a borderline 12 that extends from a front end 13 of the borderline 10 to a front end 14 of the borderline 11. The rear end 15 of the borderline 10 is connected with a rear borderline 16, which extends up to a point 17 adjacent to an additional borderline 18, which delimits a crescent-shaped part surface 19 disposed between the chip flute 6 and the ramp surface 9.

An insert seat 20 is countersunk in the shelf surface 8 and is delimited by a bottom surface 21 as well as by two diverging side support surfaces 22, 23. Defined in the bottom surface 21 is a hole 24 that, preferably, is formed with a female thread for co-operating with a male thread 25 of the tightening screw 3.

The front bar part 4 ends in a front end surface 26. Preferably, the front end surface 26 includes two part surfaces 26a, 26b that are separated by a turning line 27 and are inclined at an obtuse angle in relation to each other. Preferably, the part surface 26a extends approximately perpendicularly to the center axis C and forms an angle of about 125° with respect to the part surface 26b.

Figure 4:
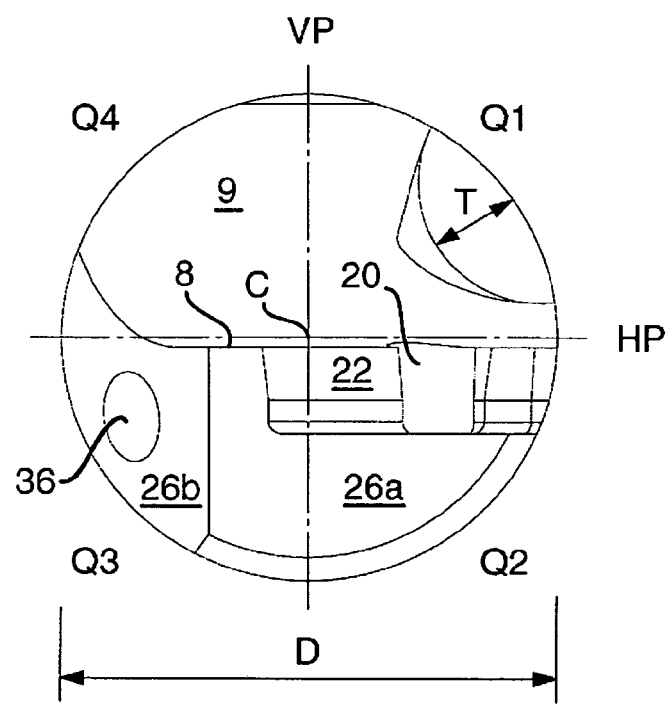
FIG. 4 is a front view showing the front part of the bar as shown in FIG. 1.

Further referring to FIG. 4, two imaginary reference planes HP and VP are shown, which henceforth are also referred to as a "horizontal plane" and "vertical plane", respectively. The reference planes HP, VP form a right angle with each other and intersect each other along the center axis C. Thus, the reference planes HP, VP delimit four similar quadrants Q1, Q2, Q3 and Q4. The quadrants Q1 and Q2 are disposed on the right side of the vertical plane VP as viewed in FIG. 4, while the quadrants Q3 and Q4 are disposed on the opposite, left side of the vertical plane VP. Simultaneously, the quadrants Q2 and Q3 are disposed under the horizontal plane HP and the quadrants Q1 and Q4 are disposed over the horizontal plane HP. In FIG. 4, the diameter of the bar is designated D.

The chip flute 6 is delimited by a concavely arched surface 28, which extends between two straight borderlines 29, 30 that may be generally parallel to the center axis C. A front opening of the chip flute 6 is defined by a borderline 31, which forms a transition to the crescent-shaped part surface 19. Preferably, the crescent-shaped part surface 19 widens toward the borderline 18 in order to provide a funnel-like inlet to the chip flute 6. The opposite end of the flute 6 is a rear end surface 32. Preferably, the axial distance between the borderline 31 and the arched borderline 33 of the end surface 32 determine a length L of the chip flute 6. This length L is preferably at least two to three times the diameter D of the bar 1, but not be greater than about five times the diameter D. By limiting the length of the chip flute 6 to at most five times the diameter D, it is believed that the bar 1 has an optimum stiffness because the reduction of material for the flute 6 is limited to what is absolutely necessary in order to evacuate chips from the holes in which the tool will operate. Preferably, the flute 6 does not extend all the way to the rear end (not shown) of the bar 1 so as to avoid unnecessarily wasting material of the bar 1.

Preferably, the depth T (see FIG. 4) of the chip flute 6 should not exceed one-fourth of the diameter D. A portion of a circle having a radius that, preferably, is greater than the depth T may define the concave shape of the surface 28. It is envisioned that the cross-section shape of the flute 6 may deviate from the one shown in FIG. 4. For example, the radius of curvature of the surface 28 may successively decrease in the direction from the borderline 29 to the borderline 30.

Figure 5:
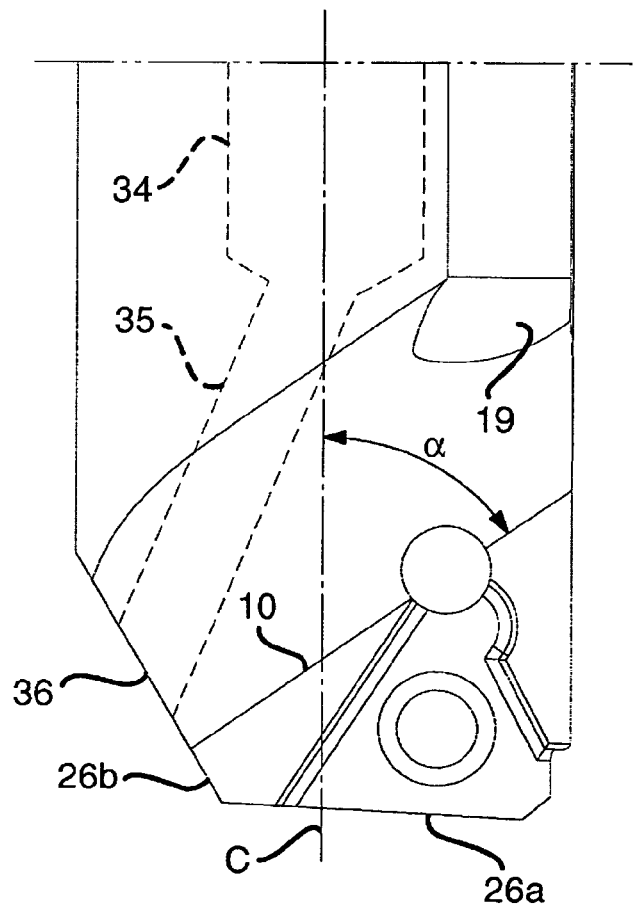
FIG. 5 is a partial plan view of the front part of the bar as shown in FIG. 1.

With additional reference to FIG. 5, dash-dotted lines are used to illustrate an example of how the bar 1 may be formed with a main channel 34 and with a branch channel 35. The main and branch channels 34, 35 preferably feed a fluid, e.g., a cooling liquid, to the front part 4 of the bar 1. Preferably, the main channel 34 extends from the rear end (not visible) of the bar 1 toward the front end 4 at which it transforms into the inclined branch channel 35. The branch channel 35 ends in a mouth 36 that is preferably disposed in the part surface 26b. Specifically, the mouth 36 is preferably disposed in the lower quadrant Q3 (see FIG. 4), i.e., disposed beside the lower quadrant Q2 in which the insert seat 20 is disposed. In other words, the mouth 36 and the insert seat 20 are preferably disposed on opposite sides of the plane VP and in different quadrants Q3, Q2, and the opening of the chip flute 6 is preferably disposed in the quadrant Q1, which is disposed above the quadrant Q2, as shown in FIG. 4.

With particular reference again to FIG. 1, the turning insert 2 mounted and fixed in the insert seat 20 by means of the screw 3. Preferably, the turning insert 2 may have a triangular basic shape and three chip-removing main edges. One of the chip-removing main edges 37 is indexed forward into an active position, while the two other main edges (lacking reference designations) assume inactive positions. Adjacent to each main edge, a first clearance surface 38 extends. An end of the main edge 37 projects radially beyond the envelope surface of the bar 1. Specifically, the main edge 37 transforms into a secondary edge 39 to which a second clearance surface 40 connects. Preferably, the second clearance surface 40 has a greater clearance angle than the first clearance surface 38. For example, the first clearance surface 38 may have a clearance angle of about 7°, while the second clearance surface 40 may have a clearance angle of about 11-17°. Furthermore, the angle between the edges 37, 39 is preferably acute, e.g., in the range of 85-89°. In practice, the complete turning tool is intended to operate at moderate cutting depths, e.g., in the range of 0.05-0.5 mm, preferably 0.1-0.3 mm. This means that a fairly slender chip is separated near the tip that is defined by the corner between the edges 37, 39.

Operation of an internal turning tool will now be described with reference to FIG. 7, wherein the complete turning tool is shown together with a workpiece 41. The workpiece 41 may be assumed to rotate, while the tool is fixedly anchored. Alternatively, the tool may be rotated and the workpiece 41 fixedly anchored. Preferably, the tool may turn a closed hole that has an absolutely minimal diameter in relation to the diameter of the boring bar. For instance, the completed hole may have a diameter in the range of 6-12 mm, the diameter D of the boring bar 1 may be 5-10 mm, and a cutting depth $a_p$ may be in range of about one-tenth mm. Accordingly, a hole surface 42 is generated that is separated from the envelope surface 5 of the boring bar by an annular gap 43. The width of the annular gap 43 is preferably about 1 mm or less. Preceding the cutting edge 37, the gap 43 is even thinner. If, according to the example, the hole is closed, then the chips that are removed in the cutting zone, i.e., in the area of the protruding tip of the turning insert 2, have to be evacuated via the considerably wider chip flute 6. Specifically, all chip evacuation should occur via the flute 6 without any chips contacting the generated hole surface (downstream the cutting tip).

In the example, during the turning of the closed hole, the cooling liquid is flushed out via the outlet mouth 36 in a flow that mostly flushes over the turning insert 2, e.g., from the part surface 26b toward the funnel-like inlet mouth 19 of the chip flute and further rearward through the flute 6. A certain quantity of liquid may also flow along the inside 42 of the workpiece 41, which rotates in the direction of the arrow in FIG. 7, so as to flush over the tip of the turning insert 2 and in co-operation with chip breakers on the turning insert 2 contribute to bringing the chips in the direction obliquely rearward/inward. By the fact that the ramp surface 9 is concavely arched and directed obliquely rearward toward the inlet mouth of the chip flute 6, the main flow of liquid from the mouth 36 toward the inlet opening of the chip flute 6 will flush the chips in a focused chip flow primarily directed toward the chip flute 6.

A fundamental advantage of boring bars according to the invention is that the fine turning of small internal, closed holes may be enabled to provide more precise holes having diameters less than about 12 mm. Thus, in practice, boring bars having a diameter D of 8-10 mm may be used to turn holes having a diameter of about 9-11 mm. By virtue of disposing a chip flute 6 on the same side of the boring bar 1 as the insert seat 20, and supplying cooling liquid via a mouth 36 disposed on the opposite side of the boring bar 1, a efficient chip evacuation is provided such that the generated hole surface obtains and retains a very good surface finish and good dimension tolerances. As a consequence of the chip flute only minimally removing material from the bar, the bar provides optimum stiffness for the given the external conditions. Accordingly, it is believed that the forces acting on the turning insert and the bar do not cause troublesome vibrations.

It is envisioned that the design of the front part of the boring bar may vary most considerably. For instance, in lieu of the two part surfaces 26a, 26b, a single continuous front surface may extend approximately perpendicularly to the center axis, and the outlet mouth of the cooling-liquid channel may be disposed in the half of the single continuous surface that is spaced apart from the insert seat. It is also envisioned that the cooling-liquid channel mouth may be disposed on the envelope surface of the bar, provided that the mouth is located axially in front of an imaginary cross-section plane in the area of the inlet opening of the chip flute.

It is also envisioned that the outlet mouth of the cooling-liquid channel may be disposed on the inclined/concave ramp surface, i.e., in the half spaced apart from the chip flute (e.g., in the quadrant Q4 of FIG. 4). However, such a mouth is preferably disposed as peripheral as possible in relation to the center axis.

It is also envisioned that boring bars according to the invention may include more than a single branch channel for supplying cooling liquid. Accordingly, with reference to FIG. 4, in addition to the channel mouth shown in the quadrant Q3 (FIG. 4), a mouth of a second branch channel may be disposed in the quadrant Q4, wherein cooling liquid could be flushed out simultaneously via both branch channels.

It is also envisioned that the chip flute does not need to be straight. For example, from the front opening of the ramp surface, the chip flute may extend helicoidally along the envelope surface of the bar. Furthermore, it is also envisioned that the fluid guiding the chips may be achieved using fluids other than a cooling liquid, e.g., air. Specifically, if the cutting depth is moderate and the tool feeding speed is low, sufficient cooling may be provided for by means of air.

It is also envisioned that boring bars according to the invention need not have the same, e.g., cylindrical, cross-section shape along the entire length of the boring bar. Accordingly, the rear part of the boring bar may be thickened and more robust.

It is further envisioned that tools according to the present invention may also be used for machining operations other than internal turning, e.g., face turning such as the planar, annular end surface that surrounds the hole.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A boring bar for internal turning in a hole of a workpiece, the boring bar comprising:
   a center axis about which there is relative rotation with respect to the workpiece;
   a front part including a front end surface and a pocket, the pocket including:
      a shelf-like surface including a countersunk insert seat adapted to receive a turning insert, the insert seat being disposed asymmetrically with respect to the center axis; and
      a ramp surface extending obliquely from the shelf surface;
   a chip flute extending backward from a front opening at the ramp surface of the pocket, the chip flute being defined by a recess in an external surface and disposed on a same side of the center axis as is the insert seat; and
   an internal channel adapted to supply a fluid to the front part, the internal channel including an outlet mouth disposed on an opposite side of the center axis from the insert seat, wherein the fluid is adapted to flow past the insert seat toward the front opening of the chip flute.

2. The boring bar according to claim 1, wherein the outlet mouth of the internal channel is defined by the front end surface of the front part.

3. The boring bar according to claim 2, wherein the front surface comprises first and second part surfaces, the first part surface includes an opening defined by the insert seat, and the second part surface extends obliquely from the first part surface and defines the outlet mouth of the internal channel.

4. The boring bar according to claim 1, wherein the shelf surface of the pocket transforms into the ramp surface at a borderline, and both the ramp surface and the borderline are disposed obliquely with respect to the center axis, the borderline extends between a front end proximate the outlet mouth of the internal channel and a rear end proximate the front opening of the chip flute.

5. The boring bar according to claim 1, wherein imaginary first and second perpendicular reference planes intersect along the center axis and define sequential first, second, third and fourth imaginary quadrants disposed about the center axis, the front opening of the chip flute is disposed in the first quadrant, the shelf surface is disposed to one side of the second reference plane such that the insert seat is at least partially disposed in the second and third quadrants, and the outlet mouth of the internal channel is disposed in the third quadrant.

6. The boring bar according to claim 1, wherein the external surface is generally cylindrical with a diameter, the chip flute extends a length between the front opening and a rear end surface, and the length of the chip flute is at least three and at most five times the diameter of the external surface.

7. The boring bar according to claim 1, wherein the external surface is generally cylindrical with a diameter, and a depth of the recess of the chip flute is at most one-fourth of the diameter.

8. The boring bar according to claim 1, further comprising:
   a crescent-shaped part surface extending between and coupling the ramp surface of the pocket and the front end of the chip flute, the crescent-shaped part surface defining a portion of a funnel that widens from the chip flute to the ramp surface.

* * * * *